United States Patent [19]

Van Dusen et al.

[11] Patent Number: 5,615,904
[45] Date of Patent: Apr. 1, 1997

[54] DRAWBAR COUPLER FOR AN AUTOMOTIVE VEHICLE HITCH RACK

[75] Inventors: Donn S. Van Dusen, Loma Rica; Douglas P. Gibbs, Yuba City, both of Calif.

[73] Assignee: Advanced Accessory Systems, LLC, Port Huron, Mich.

[21] Appl. No.: 575,113

[22] Filed: Dec. 18, 1995

Related U.S. Application Data

[63] Continuation of Ser. No. 392,409, Feb. 22, 1995, abandoned, which is a continuation of Ser. No. 144,155, Oct. 27, 1993, abandoned.

[51] Int. Cl.$^6$ .................................. B60R 9/10; B60D 1/58
[52] U.S. Cl. ...................... 280/506; 280/491.5; 224/924; 224/506; 224/507; 224/521
[58] Field of Search .................. 280/491.5, 491.1, 280/495, 500, 506, 507; 224/42.03 A, 42.03 B, 42.03 R

[56] References Cited

U.S. PATENT DOCUMENTS

| | | | |
|---|---|---|---|
| 4,099,658 | 7/1978 | Bott | 224/42.1 |
| 4,156,497 | 5/1979 | Bott | 224/326 |
| 4,274,570 | 6/1981 | Bott | 224/324 |
| 4,295,587 | 10/1981 | Bott | 224/321 |
| 4,322,087 | 3/1982 | Addicks | 280/279 |
| 4,323,182 | 4/1982 | Bott | 224/321 |
| 4,364,500 | 12/1982 | Bott | 224/325 |
| 4,428,517 | 1/1984 | Bott | 224/326 |
| 4,432,478 | 2/1984 | Bott | 224/321 |
| 4,705,448 | 11/1987 | Mungons | 224/42.03 B |
| 4,856,686 | 8/1989 | Workentine | 224/42.03 B |
| 5,025,932 | 6/1991 | Jay | 224/42.03 B |
| 5,060,961 | 10/1991 | Bontrager | 280/279 |
| 5,169,042 | 12/1992 | Ching | 224/42.03 B |
| 5,181,822 | 1/1993 | Allsop et al. | 280/513 X |
| 5,197,349 | 3/1993 | Herman | 280/278 X |
| 5,244,133 | 9/1993 | Abbott et al. | 224/42.03 B |
| 5,344,175 | 9/1994 | Speer | 280/506 |
| 5,449,101 | 9/1995 | Van Dusen | 280/506 X |

FOREIGN PATENT DOCUMENTS

| | | | |
|---|---|---|---|
| 2026641 | 3/1992 | Canada | 224/42.03 B |
| 2235668 | 3/1991 | United Kingdom | 280/506 |

*Primary Examiner*—Kevin Hurley
*Attorney, Agent, or Firm*—Rader, Fishman & Grauer PLLC

[57] ABSTRACT

The invention relates generally to an automotive vehicle hitch rack and more particularly to a drawbar coupler that provides a connection to a tow hitch on an automotive vehicle. The coupler comprises a drawbar which interfaces with the tow hitch to provide opposed overlapping surfaces, and a tightener which applies force to maintain the opposed overlapping surfaces together. The invention significantly reduces play between the drawbar and the tow hitch.

4 Claims, 1 Drawing Sheet

U.S. Patent
Apr. 1, 1997
5,615,904
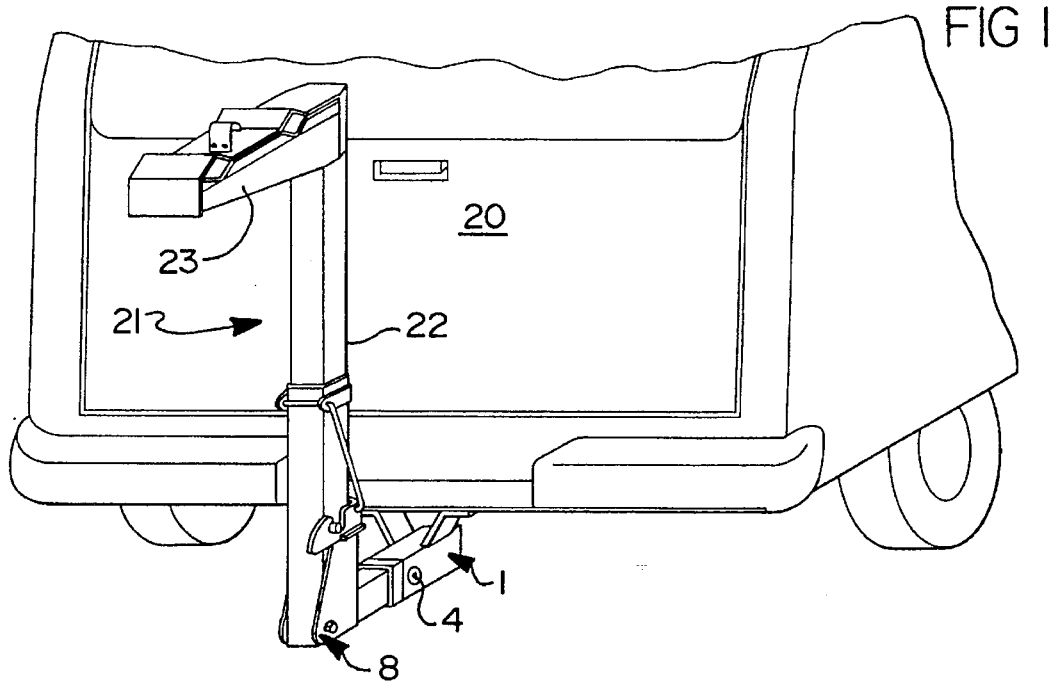
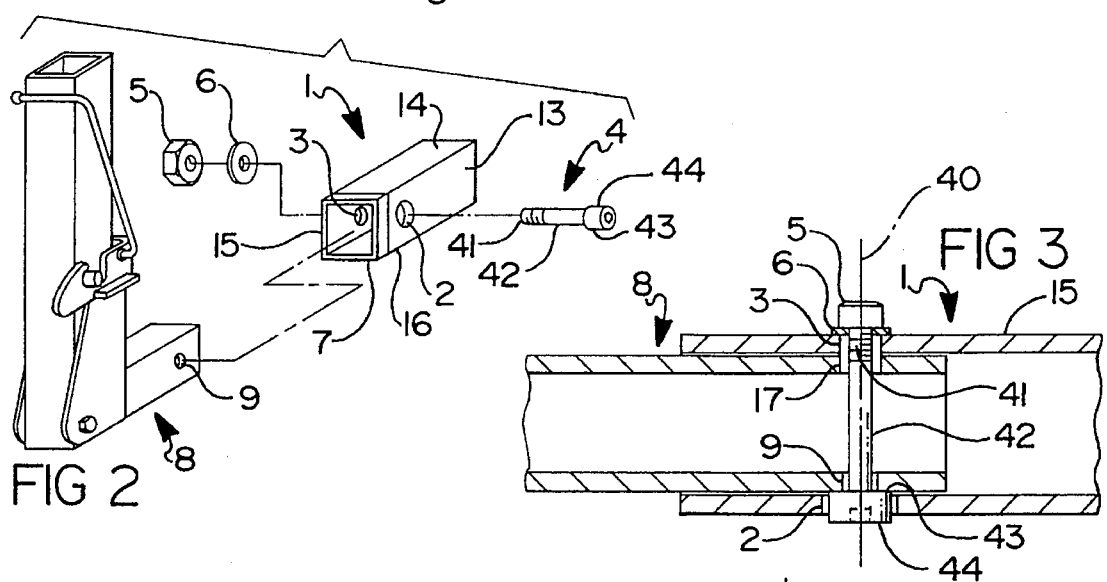
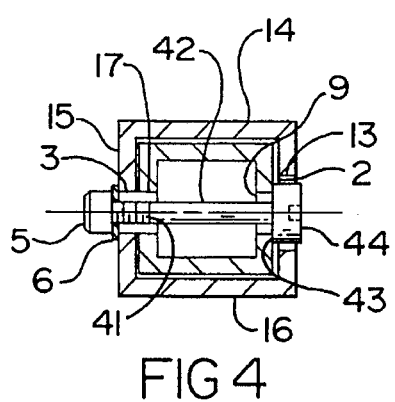
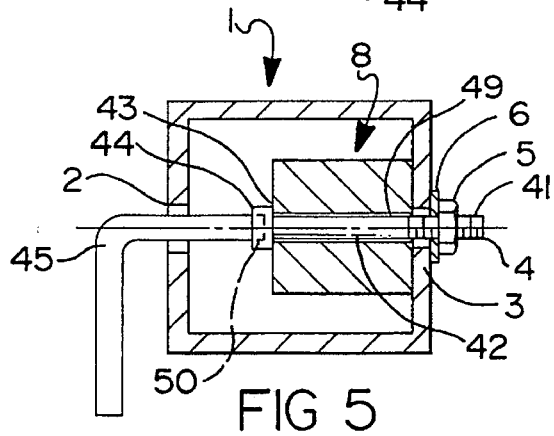

DRAWBAR COUPLER FOR AN AUTOMOTIVE VEHICLE HITCH RACK

This is a continuation of application Ser. No. 08/392,409 filed Feb. 22, 1995 now abandoned which is, in turn, a continuation of application Ser. No. 08/144,155 filed Oct. 27, 1993 (now abandoned).

BACKGROUND OF THE INVENTION

The invention relates generally to automotive vehicle hitch racks and more particularly to a drawbar coupler that provides connection to a tow hitch on an automotive vehicle.

Hitch carrier racks for automotive vehicles are increasingly desirable. Such a rack has a coupler to be received in the receptacle of a receiver-type tow hitch normally used to receive a coupling arrangement for connection to a trailer to be pulled or pushed. Racks commonly support bicycles, ski equipment, or other Sporting or recreational articles. For example, one type of a hitch rack is a hitch rack bike carrier. A hitch bike carrier is a rack which suspends one or more bicycles at the rear of an automotive vehicle (or sometimes at the front of a large vehicle), with the bicycle support structure cantilevered upwardly from a hitch receiver on the vehicle.

Tow hitches are bolted or installed onto holes provided by the automotive vehicle manufacturer.

Typically, these holes are located in the frame of an automotive vehicle. Tow hitches can be installed in the rear, front, or any other portion of the automotive vehicle. Despite the term "tow hitch," the rack, trailer, boat, etc., coupled to this tow hitch via the drawbar coupler is not necessarily towed. The drawbar coupler allows the rack or trailer to be pulled, pushed, or carried in any direction the vehicle is moving.

Four classes of hitches exist to fit almost every automotive vehicle on the road. The most common in past years was the Class I variety of the ball and tongue style of hitch. Recently, however, Class III hitches have become the most popular. Class III hitches differ structurally from class I hitches in that the tongue and ball are replaced by a tubular receptacle (receiver). Because Class III tow hitches are rated to tow 5,000–10,000 lbs, they are flexible enough for a wide variety of applications. They are also aesthetically pleasing. Class II and IV hitches also contain receptacles like the Class III variety and the present invention is equally applicable to these types.

A receiving type of tow hitch normally consists of a square-walled hollow receptacle (often called a "receiver") having a number of bolt holes on its side wails. Various types of couplers provide the connection between this type of tow hitch and the rack or trailer carrying the sporting articles.

Because the manufacturer of the receiving type of tow hitch may not necessarily be the manufacturer of the drawbar coupler, the size of the receptacle on the receiving type of toe hitch must be considered in designing a coupler. Most standard drawbar couplers are fabricated to be smaller than the receptacle hole. Because of the difference in sizes, some free movement, or play, of the drawbar coupler occurs. This play creates unwanted oscillations and vibrations on the rack. In fact, a small amount of play creates a large amount of unwanted oscillations on the rack or trailer. This "amplification" occurs because of the lever-type action of the drawbar. The coupling point of the drawbar and the receptacle acts as a "fulcrum," and, any arc distance traveled by the drawbar far from the fulcrum is relatively great. The recreational equipment or other articles carried by a hitch rack generally are mounted far from the fulcrum. That is, the bars and rails on hitch racks are designed so that the sporting articles are at a certain minimum distance from the automotive vehicle and at a particular orientation relative to the automotive vehicle. Ultimately, the play reduces the life of the rack and the product mounted on the rack or trailer.

Most hitch racks today are designed for a loose fit between the receiving type of tow hitch and the drawbar coupler. Applicant is not aware of the existence of any hardware or mechanism that will alleviate this play. Applicant is only aware of arrangements in which the drawbar coupler is secured to the receiving type of tow hitch with a pin at the surface of the tow hitch. However, this merely keeps the drawbar in place. The lack of any effective tightening of the surfaces allows some shifting of the drawbar within the hitch receiver.

It will be appreciated that because of the cantilever suspension of the bike or other article support structure, a minor lack of rigidity introduced by a joint can be magnified to be a major problem.

SUMMARY OF THE INVENTION

The present invention addresses these problems. The present invention provides a rack cantilever construction with a coupler having a tightener designed to maintain intimate contact between a surface of the drawbar and a surface of the tow hitch irrespective of vehicle movement. More particularly, it applies appropriate opposing forces about overlapping surfaces of the drawbar and tow hitch so that the drawbar is tightened against one side wall of the tow hitch. The tightener is fabricated of high stress and high tensile material such as metal. Accordingly, tolerances on the tow hitch become an insignificant parameter in the design of the drawbar coupler.

The embodiments of the present invention demonstrate that securing and tightening one surface of the drawbar to one surface of the tow hitch with a tightener substantially avoids unwanted oscillations and vibrations on the rack and rack-mounted equipment. Specifically, play resulting from tolerances between the drawbar and tow hitch is significantly reduced.

A preferred embodiment of the coupler of the invention comprises a drawbar which interfaces with a tow hitch by providing opposed overlapping surfaces, and a tightener which applies a force to maintain the opposed overlapping surfaces together. Typically, a tow hitch receiver has at least one pair of bolt holes. The drawbar of the present invention also has one or more pair of bolt holes. It is configured such that the two pairs of bolt holes (the holes in the tow hitch and those in the drawbar) can be aligned when the drawbar is coupled to the tow hitch. When the holes are aligned, a tightener is coupled into at least one hole to tighten the drawbar to the tow hitch on one set of surfaces. The tightener need not be inserted in both bolt holes initially, so long as one of the bolt holes is utilized in the present invention.

The through bolt holes are essentially coaxial to allow a portion of the tightener to be inserted. The only difference between a plain bolt hole and a through bolt hole is the thickness of the material in which the hole is formed (or the length of the hole). No other difference is apparent to the applicant and any reference of bolt hole also includes a through bolt hole. If the drawbar is not hollow, it may have a through bolt hole instead of a pair of bolt holes.

The tightener preferably comprises a tail, a midsection, a shoulder, a head, and a nut. The tail is typically threaded and its diameter is smaller than the diameters of all aligned holes on the drawbar and the tow hitch The midsection located between the shoulder and the tail, has a diameter that is also smaller than the diameters of all aligned holes on the drawbar and the tow hitch. The shoulder, attached to the midsection, has a diameter larger than that of the midsection. In one embodiment, the diameter of the shoulder is smaller than the diameter of the aligned hole on the tow hitch and the diameter of at least one aligned hole on the drawbar, but larger than the diameter of another aligned hole on the drawbar. Finally, the nut is coupled coaxially and tightened to the tail such that a force is applied from the nut to the surface it is touching, typically one outside surface of the tow hitch, and a reactive force is thereby applied from the shoulder to the surface it is touching, typically one inside surface of the drawbar. The nut may also be of the prevailing torque variety whereby it may not be threaded or unthreaded from the tail unless an appropriate wrench is applied to the specifically-designed groove of the head.

The relationship of some of the diameters of the aligned holes also plays a role in the present invention. The diameter of the aligned hole on the drawbar is smaller than the diameter of a corresponding aligned hole on the tow hitch. Additionally, the diameter of one aligned hole on the drawbar is smaller than the diameter of another aligned hole on the drawbar. This allows the shoulder of the tightener to apply a force on a drawbar surface toward the tow hitch surface when the nut is threaded and tightened onto the tail of the tightener. Accordingly, one set of surfaces is tightened together; other sets of surfaces remain separated.

BRIEF DESCRIPTION OF THE DRAWING

With reference to the accompanying drawing:

FIG. 1 is a typical application of a preferred embodiment of the present invention as the rack is coupled to a tow hitch mounted at the rear of an automotive vehicle;

FIG. 2 is an exploded isometric view of the preferred embodiment of FIG. 1;

FIG. 3 is a top, plan cross-sectional view of the preferred embodiment of FIG. 1;

FIG. 4 is a cross-sectional view of the preferred embodiment of FIG. 1; and

FIG. 5 is another embodiment of the invention.

DETAILED DESCRIPTION OF PREFERRED EMBODIMENTS

In FIG. 1, a preferred embodiment of the present invention is shown. A rear end 20 of an automotive vehicle is shown with a standard tow hitch 1 of the receiving type coupled to the drawbar 8, and a portion of a tightener 4. A hitch rack carrier of the invention, generally referred to by the reference numeral 21, is shown in place of the ball or other arrangement typically associated with a tow hitch of this nature. Such rack includes an elongated arm 22 having at its upper end, an article support structure 23.

A tow hitch 1 of the receiving type is installed under the bumper of the automotive vehicle. A drawbar 8 is coupled to the tow hitch 1. A drawbar 8 is provided as part of the rack 21 to secure it to a vehicle. As will be discussed hereinafter, such securance is designed in the instant arrangement to assure that there is a rigid connection between the rack 21 and the vehicle tow hitch 1. Arm 22 is part of a cantilever construction arrangement for the rack.

FIG. 2 shows an exploded isometric view of this preferred embodiment. The tow hitch 1 has a receiver 7 defined by four walls 13, 14, 15, and 16. At least two bolt holes 2 and 3 are located on opposite walls 13 and 15. In the telescoped position, the walls of the drawbar 8 are located within the walls of the tow hitch 1 such that at least one bolt hole 9 in the drawbar aligns with at least one bolt hole 2 in the tow hitch 1. Typically, two bolt holes on opposite walls of the drawbar align with two bolt holes on opposite walls of the tow hitch.

The bolt hole alignment allows a portion of the tightener 4 to be inserted in every aligned bolt hole to secure the drawbar 8 to the tow hitch 1. A portion of the tightener 4, which is cylindrically shaped in this embodiment, comprises a threaded tail 41, a midsection 42, a shoulder 43, and a head 44. A washer 6 and a nut 5 are coaxially coupled and tightened onto the tail 41 of a portion of the tightener 4. The relationship of the nut 5 and the washer 6 is such that references to the nut includes the washer. However, the washer is not necessarily essential to the performance of the nut 5.

The diameter of the shoulder 43 of a portion of the tightener 4 is smaller than the diameter of the bolt hole 2 in the tow hitch 1 In this particular embodiment, however the diameters of the shoulder 43 and, as shown, of the head 44, are larger than the diameter of the bolt hole 9 in the drawbar. Finally, to allow a portion of the tightener 4 to be inserted into the aligned bolt holes, the diameter of the aligned bolt holes are each larger than each of the diameters of the tail 41 and midsection 42 of a portion of the tightener 4.

As shown in the top cross sectional view of FIG. 3, the nut 5 is tightened around the threaded tail 41 of a portion of the tightener 4 and applies a force on the surface it is touching, namely the outer surface of the tow hitch wall 15 containing bolt hole 3. Consequently, the shoulder 43 also applies a force against the surface of the drawbar it is touching, namely the outer surface of the wall containing the bolt hole 9. In this connection, as illustrated the diameter of the shoulder and head 44 are smaller than the diameter of the hole 2 so that recess is formed in the latter for the head and shoulder. The opposed overlapping surfaces are the outer surface of the drawbar wall containing bolt hole 17 and the inner surface of the tow hitch wall 15 containing bolt hole 3. FIG. 4 shows a different cross sectional view of the preferred embodiment. As can be seen from both FIG. 3 and FIG. 4, the recess within which the bolt head and shoulder fit generally encompasses the exterior side of the head and is configured to be sufficiently closely spaced to such surface that it will prevent grasping of it by common removal tools, such as wrenches and pliers. Moreover, the tightener generates opposed overlapping surfaces to secure the drawbar to the tow hitch while significantly reducing unwanted play of the drawbar.

It should be noted that as illustrated the exterior surfaces of both the head 44 and the nut 5 are straight, i.e., each includes straight lines which run for its full length, which straight lines are generally parallel to the mid-section axis represented at 40.

FIG. 5 shows another embodiment of the invention. As before, the tow hitch 1 has two bolt holes 2 and 3. The drawbar coupler 8 telescopes into the tow hitch 1. In this embodiment, however, the drawbar coupler 8 is solid throughout its body except for at least one through bolt hole 49. A portion of the tightener 4 tightens the drawbar coupler 8 to the tow hitch 1 by applying appropriate forces along the walls forming the opposed overlapping surfaces. The shoulder 43 applies a force on the drawbar toward a wall of the tow hitch and the prevailing torque nut 5 applies an opposing force on the outside wall of the tow hitch toward the drawbar coupler 8.

In this alternate embodiment, the head 44 comprises a particularly designed groove 50 that communicates with an appropriate wrench 45. When the wrench 45 is inserted into the groove and an appropriate force is applied, the entire tightener can be tightened or untightened via the prevailing torque nut 5. The groove may be thought of as a security construction whereas the wrench is a key which enables the tightener to cause the overlapping surfaces to engage or disengage. Note that although a bolt hole 2 exists on one of the walls of the tow hitch 1, a tightener need not necessarily be inserted in it. Although the wrench 45 and the specifically-designed groove 50 on the head 44 are shown for this particular embodiment, this feature of the tightener may be incorporated in other embodiments of the invention.

What is claimed is:

1. An automotive vehicle rack for connection to a tow hitch of a vehicle, which tow hitch has a receiver, comprising the combination of:

(A) article support structure for an article to be carried by the rack;

(B) a coupler for connecting the rack to said tow hitch, said coupler including:

(i) a drawbar that telescopes within said tow hitch receiver to provide an opposed pair of overlapping receiver and drawbar surfaces, said drawbar and tow hitch having registerable bolt holes, the relative locations of the bolt holes being such that when the drawbar is telescoped within the tow hitch receiver, at least one telescoped position exists in which the bolt hole in the tow hitch receiver is aligned with the bolt hole in the drawbar with overlapping receiver and drawbar surfaces in contact with one another; and (ii) a tightener which normally applies force to maintain said receiver and drawbar overlapping surfaces in contact with one another but selectively allows disengagement thereof, said tightener comprising:

(a) a tail whose diameter is smaller than the diameter of said bolt holes;

(b) a mid-section, located between a shoulder and said tail, whose diameter is also smaller than the diameter of the aligned bolt holes and which has an axis extending for its length;

(c) a shoulder disposed at the end of the tightener opposite the tail, which shoulder has a diameter larger than an aligned bolt hole of the tow hitch receiver but smaller than the aligned bolt hole in the corresponding drawbar so that said shoulder can engage a first drawbar surface when said mid-section extends through said aligned bolt holes;

(d) a head attached to the shoulder, which head has an exterior side surface;

(e) at least one nut coupled coaxially and tightened to the tail such that when said mid-section extends through the aligned bolt holes of the overlapped receiver and drawbar, said nut engages a second coupler surface and a force is applied from the nut to said surface and a force is applied between said shoulder and the first drawbar surface to maintain the overlapped receiver and drawbar surfaces in contact with one another;

(f) the diameter of the bolt hole in the tow hitch receiver aligned with a corresponding bolt hole in the drawbar being larger than said shoulder and said head to thereby form a recess within said drawbar within which said shoulder and head reside when said shoulder is in engagement with said first drawbar surface; said recess generally encompassing said exterior side surface of said head and being configured to be sufficiently closely spaced to said head exterior surface, to prevent said head exterior surface from being grasped by common removal tools;

(C) an arm extending between and secured to said article support structure and said coupler.

2. The automotive vehicle rack of claim 1 wherein the drawbar bolt hole, the tow hitch bolt hole, the bolt head exterior side surface, and said recess are circular.

3. The automotive vehicle rack of claim 1 wherein the nut is a prevailing torque nut.

4. The automotive vehicle rack of claim 1 further comprising a specifically-designed groove on said head that communicates with a wrench.

* * * * *